UNITED STATES PATENT OFFICE.

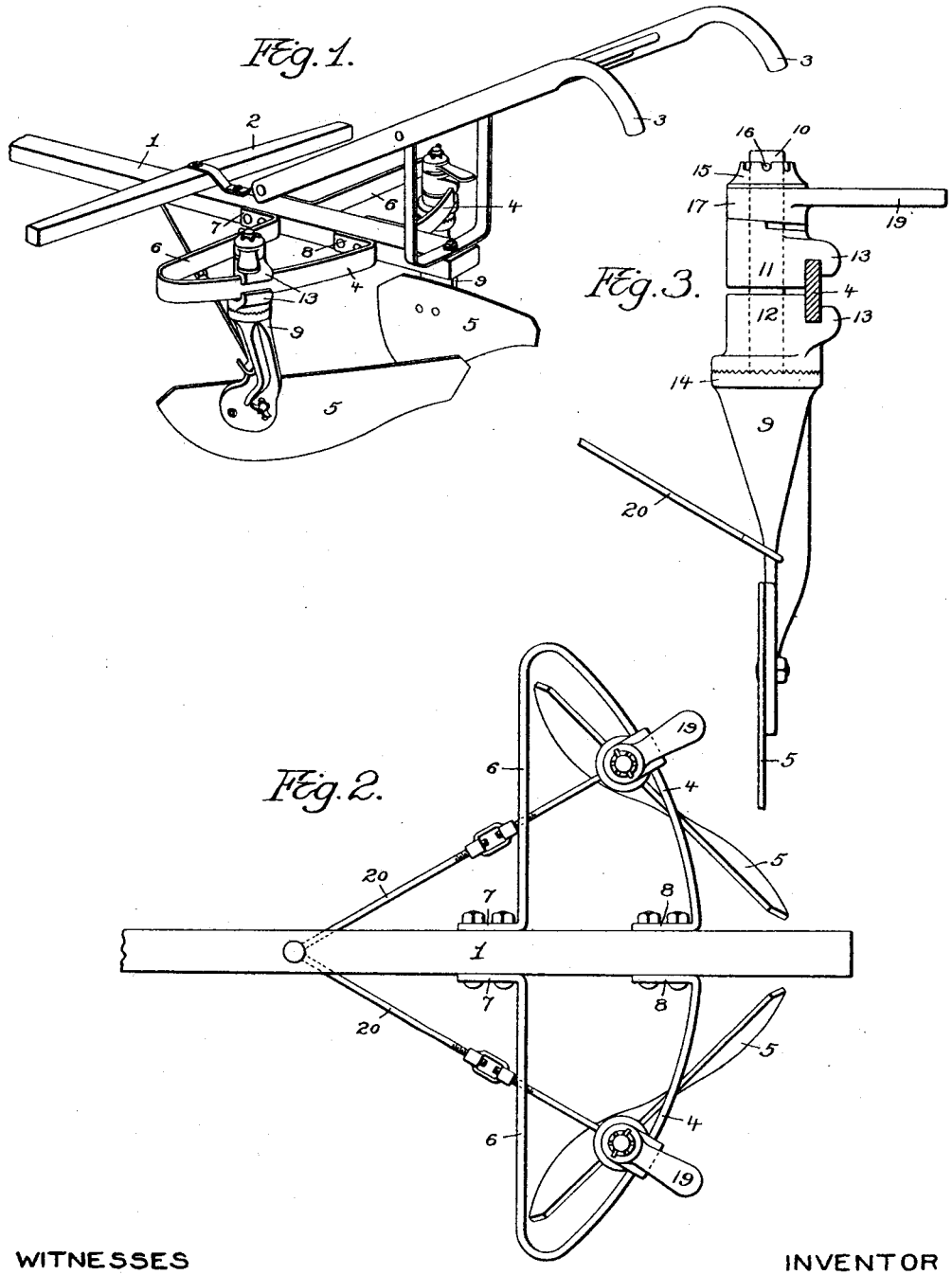

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

RIDGING DEVICE.

1,118,089. Specification of Letters Patent. Patented Nov. 24, 1914.

Application filed March 14, 1911. Serial No. 614,486.

*To all whom it may concern:*

Be it known that I, LELAND WILLIS, a citizen of the United States, residing in Grenloch, New Jersey, have invented certain Improvements in Ridging Devices, of which the following is a specification.

My invention consists of a device for turning up the soil in the form of a ridge as is frequently required in the cultivation of plants of different kinds, the object of my invention being to provide a simple and convenient device for this purpose whose ridging blades are readily adjustable so as to vary the size or character of the ridge which is being formed.

In the accompanying drawing Figure 1 is a perspective view of a ridging tool constructed in accordance with my invention; Fig. 2 is a plan or top view of part of the same, and Fig. 3 is a view partly in side elevation and partly in vertical section, and on an enlarged scale, of the clamping device employed in connection with the stem or shank of each of the ridging blades.

In the drawing, 1 represents the draft beam which has a swingletree 2 for the attachment of the team, and handles 3 for the guidance of the tool. On each side of the beam 1 is a quadrant 4 upon which is mounted the stem or shank of one of the ridging blades 5, this quadrant being conveniently and cheaply formed from a flat bar of iron or steel bent so as to form a wing 8 whereby the rear end of the quadrant is secured to the beam 1, a lateral brace 6 whereby the forward end of the quadrant is held in its proper relation to said beam and a wing 7 whereby the inner end of said brace is secured to the beam.

The stem or shank 9 to which each ridging blade 5 is secured has an upwardly projecting spindle 10 which passes through a pair of clamps 11 and 12, disposed, respectively, above and below the quadrant 4 and having jaws 13 for engaging said quadrant, as shown in Figs. 1 and 3.

The lower clamp 12 has a serrated under face for engaging the serrated upper face of a head 14 on the shank 9 of the blade carrier, as shown in Fig. 3, so that said shank can be turned to adjust the blade 5 to any desired angle in respect to the line of draft of the tool.

At the upper portion of the spindles 10 is a washer 15 which bears against a pin 16 or other suitable bearing carried by the spindle above the washer and between this washer and the inclined top of the upper clamp 11 is interposed a cam disk 17 with beveled under face engaging the beveled top of the clamp 11, this cam disk being provided with a projecting arm 19 whereby it may be readily turned in one direction or the other. When turned in one direction it will exert a lifting influence upon the spindle 10 and a depressing influence upon the upper clamp 11, thereby drawing the upper and lower clamps toward each other and firmly confining them to the quadrant 4, movement of the cam disk in the opposite direction freeing the clamps from retaining engagement with the quadrant and permitting adjustment of said clamps and of the ridger blade carried thereby to any position on the quadrant which the desired width of the ridge to be produced may require.

Direct draft is imparted to the stem or shank of each of the ridger blade carriers through the medium of a draft rod 20 which extends from said stem or shank to a point on the draft bar 1 which is coincident with the axis of the quadrants 4, both draft rods being pivotally connected to the draft bar 1 at this point, whereby adjustment of the blade carrying clamps upon the quadrants will not affect the proper performance of their functions by the draft rods.

I claim:

1. The combination, in a ridging device, of the draft bar, a curved bar connected thereto and extending outwardly therefrom, a bracing bar extending from said draft bar to the outer end of said curved bar, clamps embracing said curved bar and movable inwardly and outwardly thereon, and a ridging blade carried by said clamps.

2. The combination, in a ridging device, of the draft bar, a curved bar connected thereto and extending outwardly therefrom, a bracing bar extending from said draft bar to the outer end of said curved bar, clamps embracing said curved bar and movable inwardly and outwardly thereon, a ridging blade carried by said clamps, and a draft rod extending from said ridging blade to a point on the draft bar coincident with the axis of the curve of the bar carrying the ridging blade clamps, and pivotally mounted on the draft bar at that point.

In testimony whereof, I have signed my name to this specification, in the presence of two subscribing witnesses.

LELAND WILLIS.

Witnesses:
HARRY SNYDER,
WALTER McWHORTER.

Copies of this patent may be obtained for five cents each, by addressing the "Commissioner of Patents, Washington, D. C."